United States Patent
Kuo et al.

(10) Patent No.: US 9,332,235 B2
(45) Date of Patent: May 3, 2016

(54) IMAGING CAPTURE APPARATUS HAVING PLURALITY OF IMAGE SENSORS GENERATING RESPECTIVE IMAGE SIGNALS BASED ON EMITTED LIGHT AREAS

(71) Applicant: VISERA TECHNOLOGIES COMPANY LIMITED, Hsin-Chu (TW)

(72) Inventors: Wu-Cheng Kuo, Hsin-Chu (TW); Hsin-Wei Mao, Hsin-Chu (TW); Yu-Kun Hsiao, Hsin-Chu (TW)

(73) Assignee: VisEra Technologies Company Limited, Hsin-Chu (TW)

( * ) Notice: Subject to any disclaimer, the term of this patent is extended or adjusted under 35 U.S.C. 154(b) by 1 day.

(21) Appl. No.: 14/102,304

(22) Filed: Dec. 10, 2013

(65) Prior Publication Data
US 2015/0163466 A1 Jun. 11, 2015

(51) Int. Cl.
*H04N 9/097* (2006.01)
*H04N 9/093* (2006.01)
*H04N 9/04* (2006.01)
*H04N 9/64* (2006.01)

(52) U.S. Cl.
CPC .............. *H04N 9/097* (2013.01); *H04N 9/045* (2013.01); *H04N 9/093* (2013.01); *H04N 9/646* (2013.01)

(58) Field of Classification Search
CPC .................................... H04N 5/2258
USPC .................................. 348/272–283
See application file for complete search history.

(56) References Cited

U.S. PATENT DOCUMENTS

| | | | |
|---|---|---|---|
| 4,281,339 A * | 7/1981 | Morishita et al. | 348/236 |
| 6,611,289 B1 * | 8/2003 | Yu et al. | 348/265 |
| 2003/0156214 A1 * | 8/2003 | Guimaraes et al. | 348/342 |
| 2005/0117035 A1 * | 6/2005 | Hofflinger et al. | 348/241 |
| 2009/0002505 A1 * | 1/2009 | Imada | 348/218.1 |
| 2011/0007179 A1 * | 1/2011 | Hiramoto et al. | 348/222.1 |
| 2011/0063427 A1 * | 3/2011 | Fengler et al. | 348/65 |
| 2013/0182155 A1 | 7/2013 | Egawa | |
| 2014/0253678 A1 * | 9/2014 | Tocher | H04N 5/23238 348/36 |

FOREIGN PATENT DOCUMENTS

| | | | |
|---|---|---|---|
| JP | 2003274424 A | 9/2003 | |
| JP | 2005229408 A | 8/2005 | |
| JP | 2009009971 A | 1/2009 | |
| JP | 2013143533 A | 7/2013 | |
| WO | WO2013/050576 A2 | 4/2013 | |

OTHER PUBLICATIONS

Taiwanese Office Action dated Jan. 8, 2016, as issued in corresponding Taiwan Patent Application No. 103102415 (8 pages).

* cited by examiner

*Primary Examiner* — Christopher K Peterson
(74) *Attorney, Agent, or Firm* — Muncy, Geissler, Olds & Lowe, P.C.

(57) ABSTRACT

An imaging apparatus includes a filter, a first image sensor and a second image sensor. The filter transmits a first light in a range of wavelengths and reflects a reflected light out of the range of wavelengths. An incident light is split to the first light and the reflected light. The first image sensor receives the first light to generate a first image signal. The second image sensor receives the reflected light to generate a second image signal.

16 Claims, 9 Drawing Sheets

IMAGING CAPTURE APPARATUS HAVING PLURALITY OF IMAGE SENSORS GENERATING RESPECTIVE IMAGE SIGNALS BASED ON EMITTED LIGHT AREAS

BACKGROUND OF THE INVENTION

1. Field of the Invention

The present invention relates to an imaging apparatus, and in particular, to an imaging apparatus including a plurality of image sensors.

2. Description of the Related Art

Figure 1:
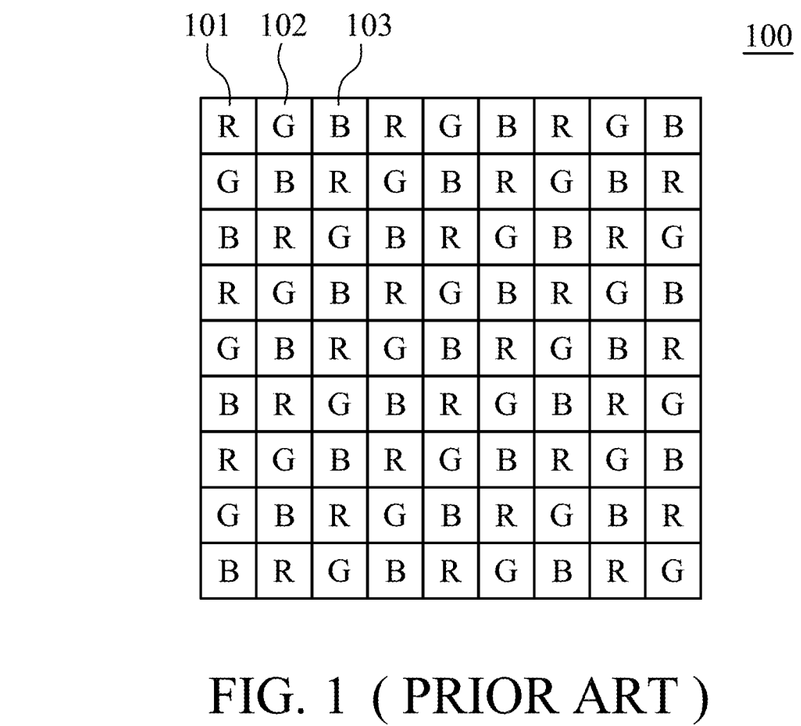
FIG. 1 is a schematic view of a conventional image sensor.

Generally, an imaging apparatus has only one image sensor. As shown in FIG. 1, a conventional image sensor 100 includes a plurality of sensing units 101, 102 and 103 arranged in an array, such as mosaic patterns. Each of the sensing units 101, 102 and 103 generates a pixel signal according to light emitted thereon. In this case, the pixel signals of the sensing units 101 are indicated as red pixel signals, the pixel signals of the sensing units 102 are indicated as green pixel signals, and the pixel signals of the sensing units 103 are indicated as blue pixel signals.

A processing module (not as shown in FIG. 1) generates image data according the red, green, and blue signals. However, two adjacent sensing units 101 are separated by the sensing units 102 and 103, for example, and red color information between two adjacent sensing units 101 is lacking. Thus, the processing module needs to compensate for the lack information for each pixel of the image data. The compensation made by the processing module may decrease the image quality of an image data and cause some problems, such as aliasing, on the image data.

BRIEF SUMMARY OF THE INVENTION

To solve the problems of the prior art, the present disclosure provides an imaging apparatus which obtains more color information for each pixel of image data.

The present disclosure provides an imaging apparatus including a first filter, a first image sensor, a second filter, a second image sensor, and a third image sensor. The first filter transmits a first light in a first range of wavelengths and reflects a first reflected light out of the first range of wavelengths. An incident light is split to the first light and the first reflected light. The first image sensor receives the first light to generate a first image signal.

The second filter transmits a second light in a second range of wavelengths and reflects a second reflected light out of the second range of wavelengths. The first reflected light is split to the second light and the second reflected light. The second image sensor receives the second light to generate a second image signal. The third image sensor receives the second reflected light to generate a third image signal.

The present disclosure provides an imaging apparatus including a first filter, a first image sensor and a second image sensor. The first filter transmits a first light in a first range of wavelengths and reflects a first reflected light out of the first range of wavelengths. An incident light is split to the first light and the first reflected light. The first image sensor receives the first light to generate a first image signal. The second image sensor receives the first reflected light to generate a second image signal.

In conclusion, the imaging apparatus utilizes a plurality of image sensors to respectively obtain each primary color. Thus, each pixel of the image data includes enough information, and the image quality of the image data is improved.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
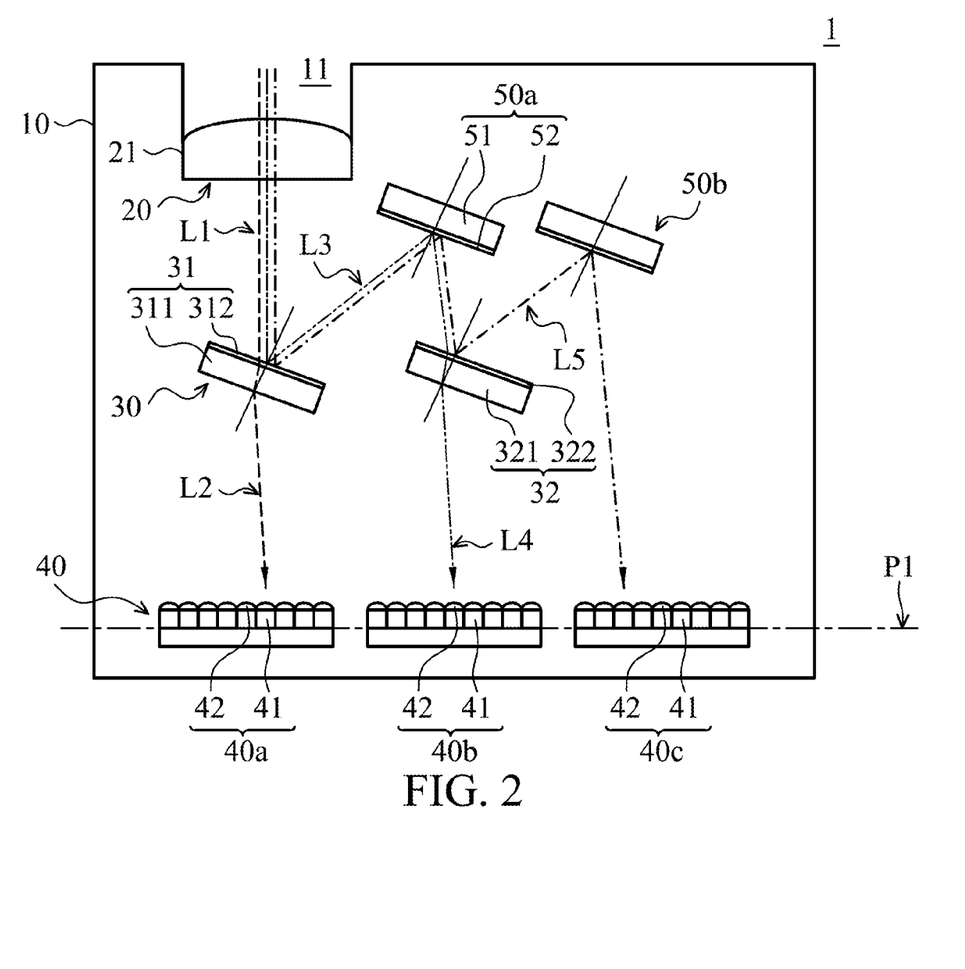
FIG. 2 is a schematic view of an imaging apparatus according to a first embodiment of the present disclosure.

FIG. 2 is a schematic view of an imaging apparatus 1 according to a first embodiment of the present disclosure. The imaging apparatus 1 may be an electronic device with a photographic function, such as a camera, a mobile phone, or a computer, or may be an imaging module with a photographic function disposed in an electronic device, such as a mobile phone, or a computer.

The imaging apparatus 1 includes a housing 10, a lens assembly 20, a filter assembly 30, a plurality of image sensors 40, and a plurality of reflecting elements 50. The housing 10 has an opening 11, and the lens assembly 20 is disposed on the opening 11. The filter assembly 30, the image sensors 40, and the reflecting elements 50 are fixed in the housing 10, or fixed on other objects in the housing 10.

In the embodiment, the lens assembly 20 includes the lens 21 as shown in FIG. 1. An incident light L1 passes through the lens 21 into the housing 10. However, generally, the lens assembly 20 may include a plurality of lenses 21 for optical purpose.

The filter assembly 30 includes a first filter 31 and a second filter 32. The first filter 31 includes a first supporting element 311 and a first multi-layered coating 312 overlapping on the first supporting element 311. The first supporting element 311 is transparent, and the first supporting element 311 may include glass, for example.

The first multi-layered coating 312 transmits a first light L2 in a first range of wavelengths and reflects a first reflected light L3 out of the first range of wavelengths. In the embodiment, the first range is about from 610 nm to 650 nm. Namely, the first light L2 passing through the first multi-layered coating 312 is red light.

The second filter 32 includes a second supporting element 321 and a second multi-layered coating 322 overlapping on the second supporting element 321. The second supporting element 321 is transparent, and the second supporting element 321 may include glass, for example.

The second multi-layered coating 322 transmits a second light L4 in a second range of wavelengths and reflects a second reflected light L5 out of the second range of wavelengths. In the embodiment, the second range is about from 540 nm to 560 nm. Namely, the second light L4 passing through the second multi-layered coating 322 is green light, and the second reflected light L5 reflected by the second multi-layered coating 322 is blue light.

The image sensors 40 may have the same structure, and may exclude a color filter. The image sensors 40 include a first image sensor 40a, a second image sensor 40b, and a third image sensor 40c. The first image sensor 40a receives the first light L2 passing through the first filter 31 to generate a first image signal, the second image sensor 40b receives the second light L4 passing through the second filter 32 to generate a second image signal, and the third image sensor 40c receives the second reflected light L5 reflected by the second filter 32 to generate a third image signal.

Figure 4:
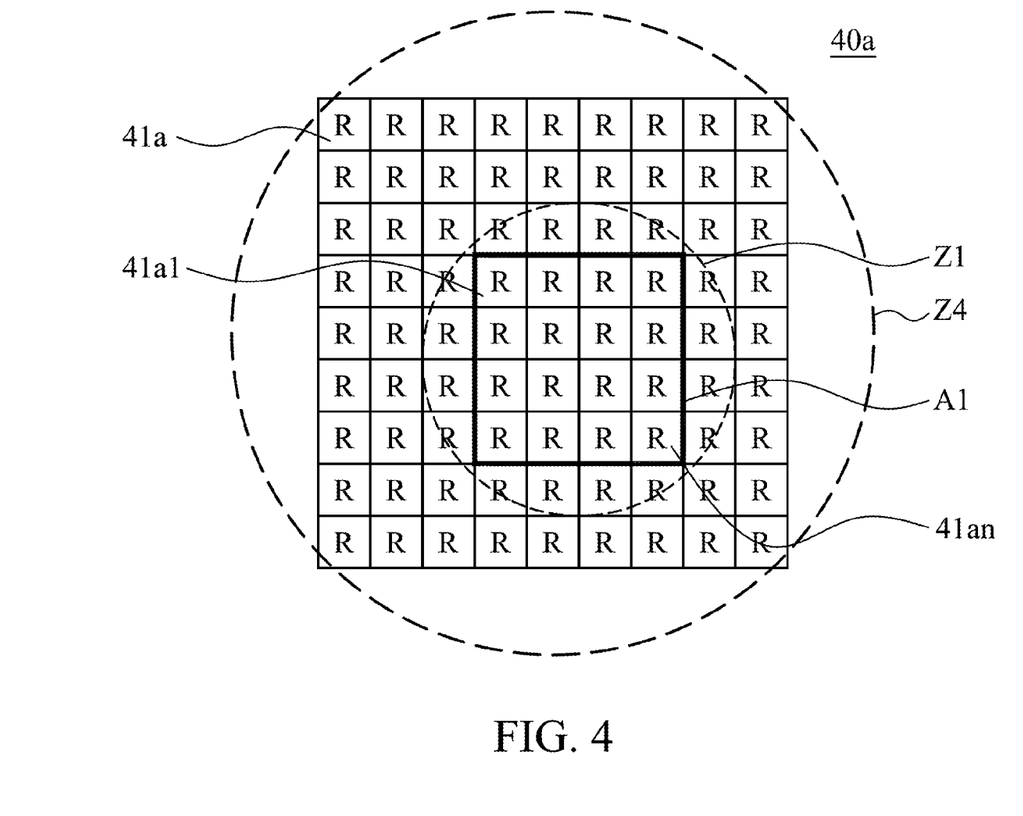
FIG. 4 is a top view of the first image sensor according to the first embodiment of the present disclosure.
Figure 5:
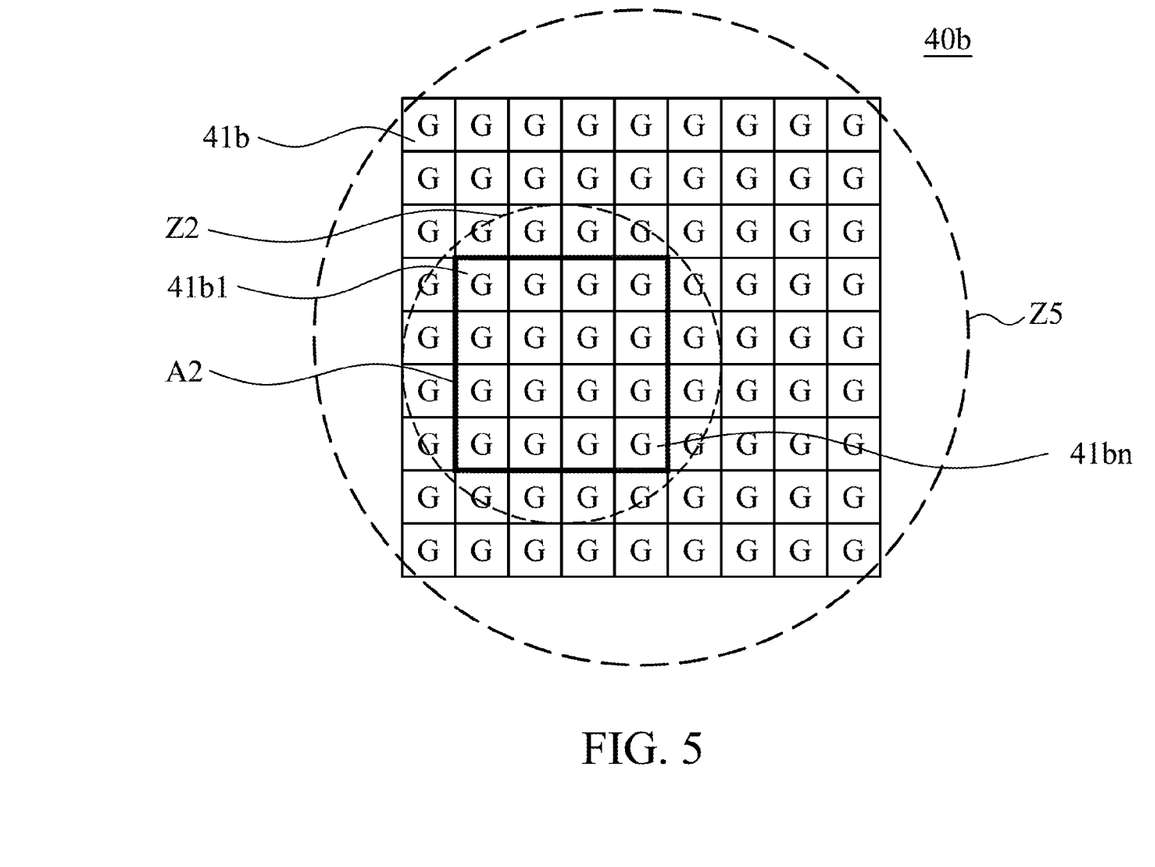
FIG. 5 is a top view of the second image sensor according to the first embodiment of the present disclosure.
Figure 6:
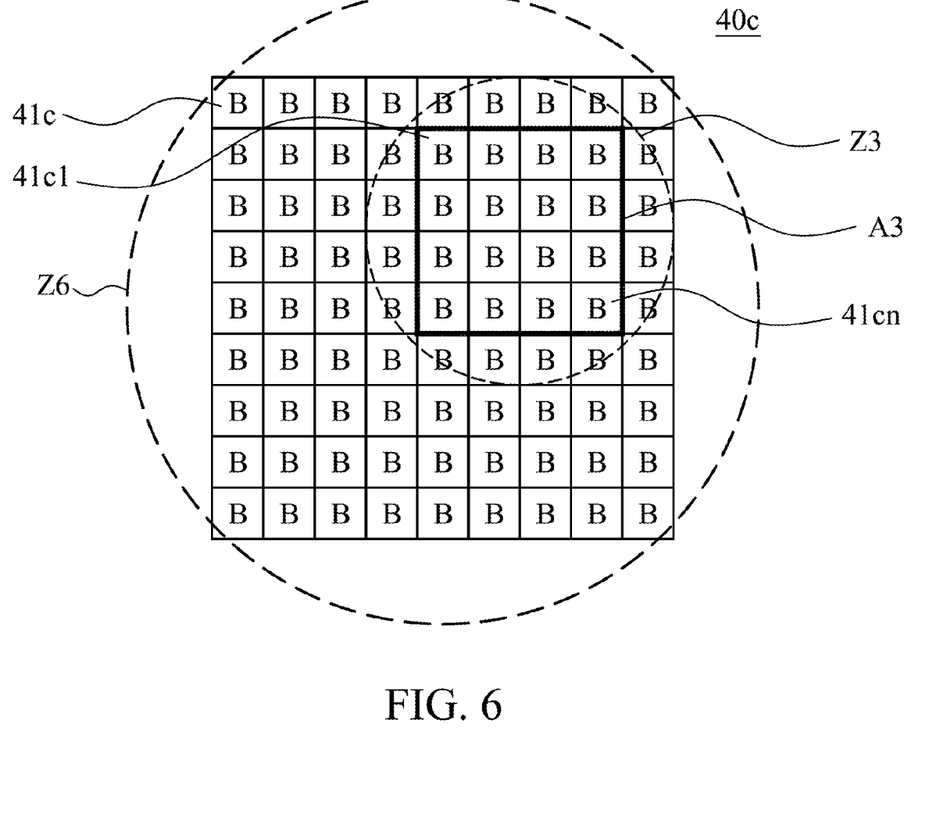
FIG. 6 is a top view of the third image sensor according to the first embodiment of the present disclosure.

Each of the image sensors 40 includes a plurality of sensing units 41 and a plurality of microlenses 42 disposed on the sensing units 41. The sensing units 41 are arranged in an array (as shown in FIGS. 4 to 6), and the microlenses 42 are arranged in an array corresponding to the sensing units 41. The second light L4 passing through the microlenses 42 is emitted to the sensing units 41.

The reflecting elements 50 may have the same structure. The reflecting elements 50 include a first reflecting element 50a and a second reflecting element 50b. Each of the reflecting elements 50 includes a substrate 51 and a reflecting coating 52 overlapping on the substrate 51. The reflecting coating 52 may include metal for reflecting light. The first reflecting element 50a reflects the first reflected light L3 reflected by the first filter 31 to the second filter 32. The second reflecting element 50b reflects the second reflected light L5 reflected by the second filter 32 to the third image sensor 40c. In particular, since the reflecting elements 50 are used to change the direction of light, the reflecting elements 50 may be excluded by modifying the positions of the filters 30 and the image sensors 40.

In the embodiment, the first filter 31, the second filter 32, the first reflecting element 50a, and the second reflecting element 50b are substantially parallel to each other. The first filter 31 is inclined corresponding to the first image sensor 40a, and the second filter 32 is inclined corresponding to the second image sensor 40b.

The first image sensor 40a, the second image sensor 40b, and the third image sensor 40c are parallel to each other. In the embodiment, the first image sensor 40a, the second image sensor 40b, and the third image sensor 40c are arranged along a flat plane P1. However, the arrangement of the filter assembly 30, the image sensors 40, and the reflecting elements 50 are not to be limited.

In the embodiment, the incident light L1 enters the housing 10 by passing through the lens 21, and the incident light L1 passing through the lens 21 emits to the first filter 31.

After the incident light L1 emits on the first filter 31, the first light L2 passes through the first filter 31 and emits to the first image sensor 40a. The first reflected light L3 reflected by the first filter 31 emits to the first reflecting element 50a. The first reflected light L3 reflected by the first reflecting element 50a emits to the second filter 32. The second light L4 passes through the second filter 32 and emits to the second image sensor 40b. The second reflected light L5 reflected by the second filter 32 emits to the second reflecting element 50b. The second reflected light L5 reflected by the second reflecting element 50b emits to the third image sensor 40c.

Figure 3:
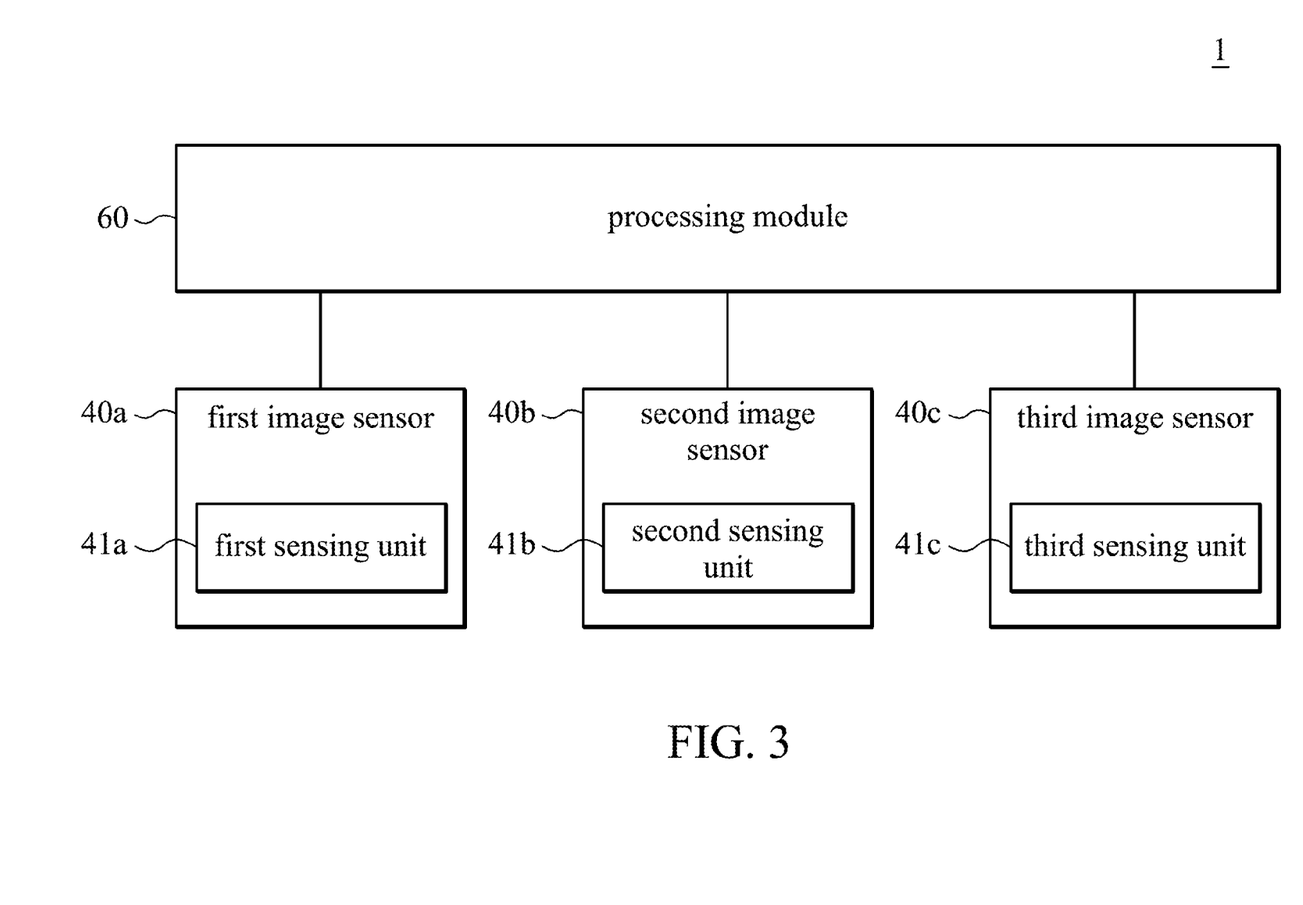
FIG. 3 is a system diagram of an imaging apparatus according to the first embodiment of the present disclosure.

FIG. 3 is a system diagram of an imaging apparatus 1 according to the first embodiment of the present disclosure. FIG. 4 is a top view of the first image sensor 40a according to the first embodiment of the present disclosure. FIG. 5 is a top view of the second image sensor 40b according to the first embodiment of the present disclosure. FIG. 6 is a top view of the third image sensor 40c according to the first embodiment of the present disclosure. The imaging apparatus 1 further includes a processing module 60 generating an image data (image or picture) according to the first, second and third image signals.

As shown in FIGS. 4 to 6, in the embodiment, each of the first sensing units 41a generates first pixel signals according to light emitted thereon, and the first pixel signals form the first image signal. Each of the second sensing units 41b generates a second pixel signal according to light emitted thereon, and the second pixel signals form the second image signal. Each of the third sensing units 41c generates a third pixel signal according to light emit thereon, and the third pixel signals form the third image signal.

The numbers of the first sensing units 41a, 41b and 41c are the same or different. In this embodiment, the numbers of the first sensing units 41a, 41b and 41c are the same.

In the embodiment, since the first image sensor 40a is emitted by red light, the first pixel signals are defined as red pixel signals. Since the second image sensor 40b is emitted by green light, the second pixel signals are defined as green pixel signals. Since the second image sensor 40b is emitted by blue light, the third pixel signals are defined as blue pixel signals. Namely, the first, second and third sensing units 41a, 41b and 41c respectively obtain one primary color, such as red light, green light or blue light.

Next, the processing module 60 generates the color image data according to the red, green, and blue pixel signals. In particular, the colors to the first, second and third pixel signals are according to the first filter 31 and the second filter 32, and thus, the colors thereof are not limited.

In the embodiment, the sensing units 41a, 41b or 41c are close to each other, but not separated by other sensing units. Therefore, the color information of each primary color is enough for each pixel of the image data. The processing module 60 may not need to perform a compensation process to the image data, and thus, the image quality of an image data is improved and some problems, such as aliasing, on the image data are eliminated.

Generally, since there are tolerances between the positions of the lens assembly 20, the filter assembly 30, the image sensors 40, and the reflecting elements 50, the areas of light emitted to the image sensors 40 are different as shown in the light areas Z1, Z2 and Z3 of FIGS. 4 to 6. Thus, the image data may be formed according to the pixel signals directly, wherein the imaging apparatus 1 is adjusted before being sold.

Therefore, an image overlapping method is provided in the present disclosure. First, a white incident light L1 emits to the lens assembly 20. The first light L2 passing through the first filter 31 and emitting to the first image sensor 40a forms a light area Z1 thereon as shown in FIG. 4, the second light L4 passing through the second filter 32 and emitting to the second image sensor 40b forms a light area Z2 thereon as shown in FIG. 5, and the second reflected light L5 reflected by the second filter 32 and emitting to the third image sensor 40c forms a light area Z3 thereon as shown in FIG. 6.

The light areas Z1, Z2 and Z3 are respectively smaller then the area of the image sensors 40, and located within the image sensors 40. A square area A1 is defined within the light area Z1, and the four corners of the square area A1 are adjacent to the periphery of the light area Z1. A square area A2 is defined within the light area Z2, and the four corners of the square area A2 are adjacent to the periphery of the light area Z2. A square area A3 is defined within the light area Z3, and the four corners of the square area A3 are adjacent to the periphery of the light area Z3. All of full scale deflections (FSD) of the sensing units 41 within the square areas A1, A2 and A3 are greater than 50%.

In this case, the first image signal is formed by the first pixel signals generated by the first sensing units 41a, which are wholly located in the square area A1. The second image signal is formed by the second pixel signals generated by the second sensing units 41b, which are wholly located in the square area A2. The third image signal is formed by the third pixel signals generated by the third sensing units 41c, which are wholly located in the square area A3.

As shown in FIGS. 4 to 6, the first sensing units 41a1 to 41an are wholly located in the square area A1 and are respectively corresponding to the second sensing units 41b1 to 41bn which are wholly located in the square area A2 and the third sensing units 41c1 to 41cn which are wholly located in the square area A3.

For example, a first pixel of the image data is generated by the processing module 60 according to the first sensing units 41a1, the second sensing units 41b1, and the third sensing units 41c1. Namely, the pixels of the image data are generated in sequence by the processing module 60 according to the first sensing units 41a1 to 41an, the second sensing units 41b1 to 41bn, and the third sensing units 41c1 to 41cn. Therefore, the image data can be formed according to the first, second and third pixel signals generated by the sensing units 41 wholly located in the square areas A1, A2 and A3.

In the image overlapping method, the sensing unit 41 corresponding to the first pixel is also determined by the following steps. First, each of full scale deflection of the sensing units 41 on the image sensors 40 is detected one by one and row by row in sequence. If the full scale deflection of one of the sensing units 41 is lower than 50%, the next sensing unit 41 is detected. The first one of the first sensing units 41 having a full scale deflection greater than 50% is determined to correspond to the first pixel.

As shown in FIG. 4, the first to third rows of the first sensing units 41a are detected in sequence, and the full scale deflections of the first to third rows of the first sensing units 41a are lower than 50%. The fourth sensing unit 41a1 in the fourth row has a full scale deflection greater than 50%, and thus the sensing unit 41a1 is determined to correspond to the first pixel of the image data. According to the same principle, the sensing units 41b1 and 41c1 is determined to correspond to the first pixel of the image data.

Furthermore, the coordinate of the sensing unit 41a1 corresponding to the first pixel of the image data on the first image sensor 40a is also determined. The sensing units 41a1 to 41an corresponding the pixels of the image data are determined by a matrix, such as a 4×4 matrix in FIG. 4. According to the same principle, the coordinate of the sensing unit 41b1 corresponding to the first pixel of the image data on the second image sensor 40b is determined. The sensing units 41b1 to 41bn corresponding the pixels of the image data are determined by a matrix, such as a 4×4 matrix in FIG. 5. The coordinate of the sensing unit 41c1 corresponds to the first pixel of the image data on the third image sensor 40c is determined. The sensing units 41c1 to 41cn corresponding the pixels of the image data are determined by a matrix, such as a 4×4 matrix in FIG. 6.

Another image overlapping method is provided in the present disclosure. First, a white incident light L1 emits to the lens assembly 20. The first light L2 passing through the first filter 31 and emitting to the first image sensor 40a forms a light area Z4 thereon as shown in FIG. 4, the second light L4 passing through the second filter 32 and emitting to the second image sensor 40b forms a light area Z5 thereon as shown in FIG. 5, and the second reflected light L5 reflected by the second filter 32 and emitting to the third image sensor 40c forms a light area Z6 thereon as shown in FIG. 6.

Further, the light area Z4 covers all of the first sensing units 41a, the light area Z5 covers all of the second sensing units 41b, and the light area Z6 covers all of the third sensing units 41c. All of full scale deflections (FSD) of the first sensing units 41a, the second sensing units 41b, and the third sensing units 41c are greater than 50%. The first pixel signals are generated in sequence by the processing module 60 according to all of the first sensing units 41a, the second pixel signals are generated in sequence by the processing module 60 according to all of the second sensing units 41b, and the third pixel signals are generated in sequence by the processing module 60 according to all of the third sensing units 41c.

In some embodiments, the periphery of the light area Z4 contacts four first sensing units 41 at four corners of the first image sensor 40a, the periphery of the light area Z5 contacts four second sensing units 41b at four corners of the second image sensor 40b, and the periphery of the light area Z6 contacts four third sensing units 41c at four corners of the third image sensor 40c by adjusting the position of the lens assembly 20, the filter assembly 30, the image sensors 40, and/or the reflecting elements 50. In addition, the full scale deflections (FSD) of the sensing units 41 at four corners of the image sensors 40 are greater then 50% (and/or lower than the average of full scale deflections (FSD) of the other sensing units 41), and the full scale deflections of the sensing units 41 at four corners of the image sensors 40 are substantially the same.

Figure 7:
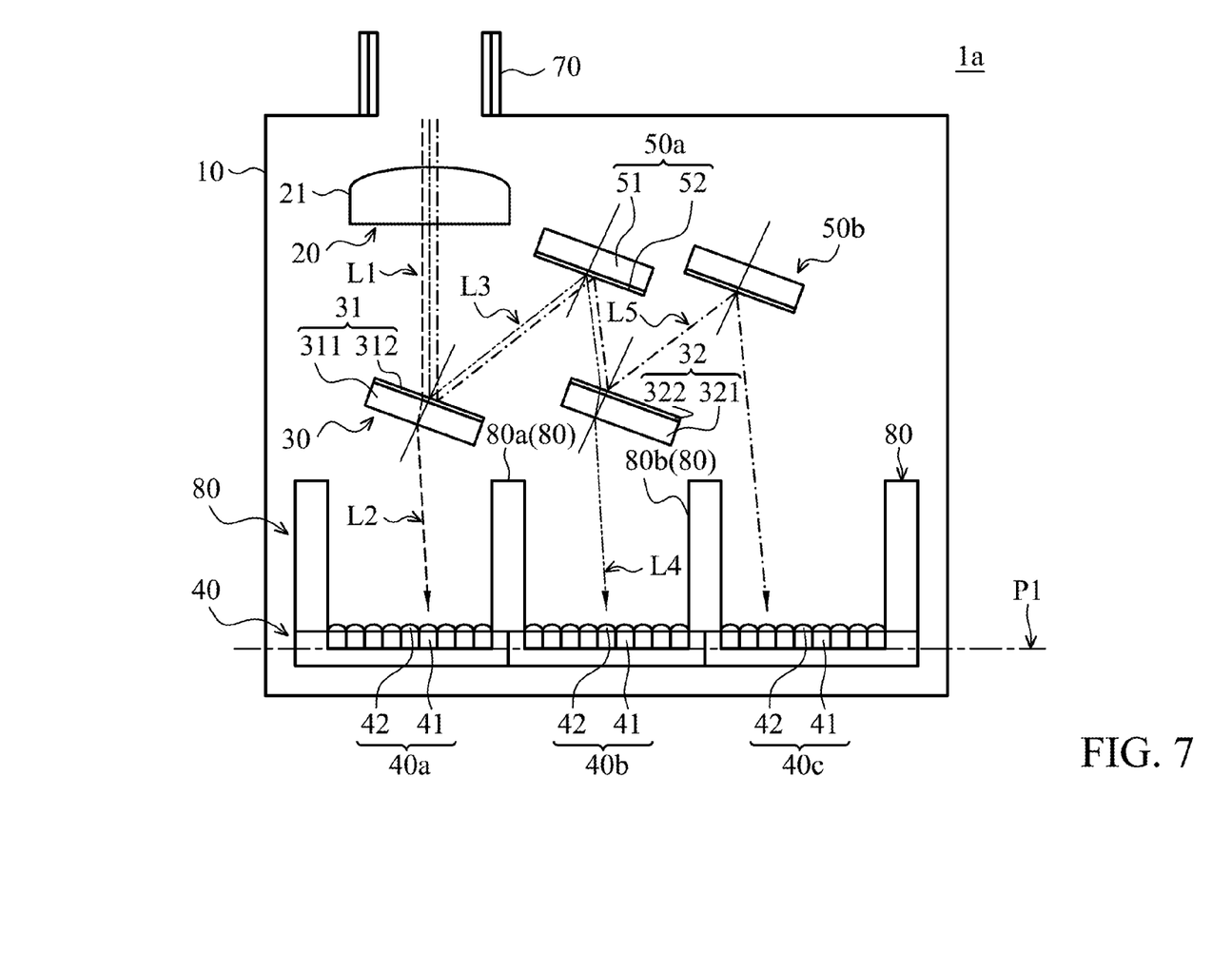
FIG. 7 is a schematic view of an imaging apparatus according to a second embodiment of the present disclosure.

FIG. 7 is a schematic view of an imaging apparatus 1a according to a second embodiment of the present disclosure. In the second embodiment, the first image sensor 40a, the second image sensor 40b, and the third image sensor 40c are formed as a single piece. The imaging apparatus 1 includes a light pipe 70 disposed on the opening 11 of the housing 10 and transmitting the incident light. The incident light L1 passing through the light pipe 70 emits to the lens 21, and thus, the optical angle of the incident light L1 is narrow.

The imaging apparatus 1 further includes a plurality of shielding elements 80 disposed on the housing 10. The shielding elements 80 are plate structures adjacent to the image sensors 40 or disposed on the image sensors 40. The shielding elements 80 are substantially parallel to each other, and perpendicular to the image sensors 40.

The shielding element 80a prevents from the first light L2 emitting to the second and third image sensors 40b and 40c, and prevents from the second light L4 emitting to the first image sensors 40a. The shielding element 80b prevents from the second light L4 emitting to the third image sensor 40c, and prevents from the second reflected light L5 emitting to the first and second image sensors 40a and 40b.

Figure 8:
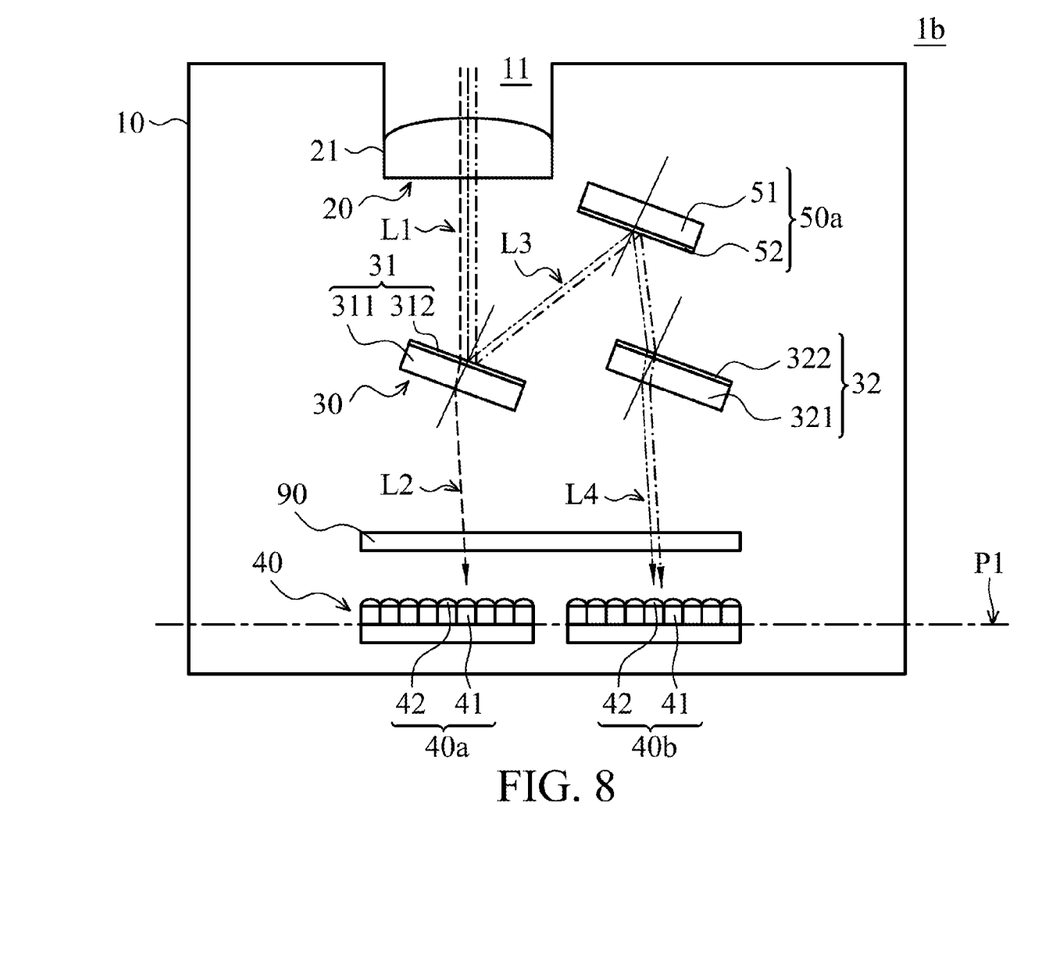
FIG. 8 is a schematic view of an imaging apparatus according to a third embodiment of the present disclosure.

In the other embodiment, the number of the filters, the image sensors, and the reflecting elements are not limited. FIG. 8 is a schematic view of an imaging apparatus 1b according to a third embodiment of the present disclosure. The imaging apparatus 1b includes a diffusing element 90 located between the filter assembly 30 and the image sensors 40. The first light L2 and/or the second light L4 passes through the diffusing element 90 and is emitted to the image sensors 40. In another case, the diffusing element 90 may be excluded.

The third image sensor 40c and the second reflecting element 50b of the first embodiment are excluded. In the embodiment, the first light L2 is red light, and the first range of the first light L2 is about from 610 nm to 650 nm. The second light L4 is cyan light, and the second range of the second light L4 is about from 500 nm to 540 nm.

The colors of the first light L2 and the second light L4 are not limited. For example, the color of the first light L2 may be blue light, and the color of the second light L4 may be yellow light, the color of the first light L2 may be green light, and the color of the second light L4 may be magenta light, the color of the first light L2 may be cyan light, and the color of the second light L4 may be red light, the color of the first light L2 may be yellow light, and the color of the second light L4 may be blue light, and the color of the first light L2 may be magenta light, and the color of the second light L4 may be green light.

Figure 9:
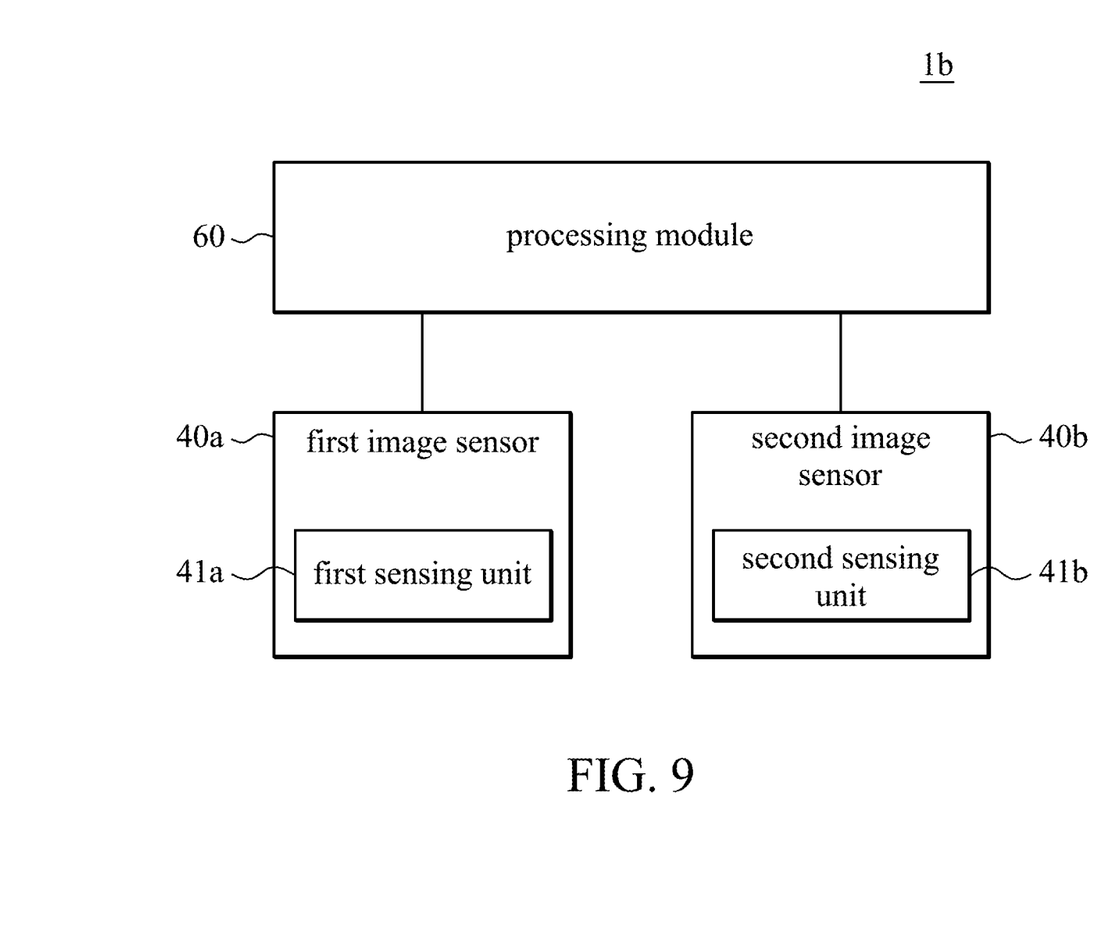
FIG. 9 is a system diagram of the imaging apparatus according to the third embodiment of the present disclosure.

FIG. 9 is a system diagram of the imaging apparatus 1b according to the third embodiment of the present disclosure. The processing module 60 generates an image data according to the first and second image signal.

In conclusion, the imaging apparatus utilizes a plurality of image sensors to respectively obtain each primary color. Thus, each pixel of the image includes enough information, and the image quality is improved.

The disclosed features may be combined, modified, or replaced in any suitable manner in one or more disclosed embodiments, but are not limited to any particular embodiments. The words, such as "first" or "second", in the specification are for the purpose of clarity description only, but are not relative to the claims or to limit the scope of the claims. In addition, the terms, such as "first feature" and "second feature", do not indicate to the same or different features.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An imaging apparatus, comprising:
    a first filter transmitting a first light in a first range of wavelengths and reflecting a first reflected light out of the first range of wavelengths, wherein an incident light is split to the first light and the first reflected light;
    a first image sensor receiving the first light to generate a first image signal;
    a second filter receiving the first reflected light, transmitting a second light in a second range of wavelengths and reflecting a second reflected light out of the second range of wavelengths, wherein the first reflected light is split to the second light and the second reflected light by the second filter;
    a second image sensor receiving the second light to generate a second image signal; and
    a third image sensor receiving the second reflected light to generate a third image signal,
    wherein the first filter is separated from the second filter,
    wherein the first image sensor comprises a plurality of first sensing units arranged in an array, and the first sensing units respectively generate a plurality of first pixel signals according to the first light,
    wherein the first light emitted to the first image sensor forms a circular first light area within an area of the first image sensor, and a square area is defined within the first light area and formed by only a portion of the plurality of the first sensing units, the first image signal is formed by the first pixel signals generated by the portion of the plurality of the first sensing units, which are wholly located in the square area, and
    wherein four corners of the square area are adjacent to a circumference of the circular first light area.

2. The imaging apparatus as claimed in claim 1, further comprising a processing module generating an image data according to the first, second and third image signals.

3. The imaging apparatus as claimed in claim 1 wherein the first light falls on some of the first sensing units, the full scale deflection of the first sensing units out of the square area are lower than 50%.

4. The imaging apparatus as claimed in claim 3, wherein all of full scale deflections of the first sensing units within the square area are greater than 50%.

5. The imaging apparatus as claimed in claim 3, further comprising a processing module generating an image data according to the first image signal, wherein the first pixel signals are generated in sequence by the processing module according to the first sensing units.

6. The imaging apparatus as claimed in claim 1, wherein the first light emitted to the first image sensor forms a first light area, and the first light area covers all of the first sensing units.

7. The imaging apparatus as claimed in claim 6, wherein all of full scale deflections of the first sensing units of the first image sensor are greater than 50%.

8. The imaging apparatus as claimed in claim 6, further comprising a processing module generating an image data according to the first image signal, wherein the first pixel signals are generated in sequence by the processing module according to all of the first sensing units of the first image sensor.

9. The imaging apparatus as claimed in claim 1, wherein the first filter comprises a first supporting element and a first multi-layered coating overlapping on the first supporting element, and the first multi-layered coating transmits the first light and reflects the first reflected light out of the first range of wavelengths.

10. The imaging apparatus as claimed in claim 9, wherein the second filter comprises a second supporting element and a second multi-layered coating overlapping on the second supporting element, and the second multi-layered coating transmits the second light and reflects the second reflected light out of the second range of wavelengths.

11. The imaging apparatus as claimed in claim 1, further comprising a diffusing element located between the first filter and the first image sensor.

12. The imaging apparatus as claimed in claim 1, further comprising a first reflecting element reflecting the first reflected light to the second filter and a second reflecting element reflecting the second reflected light to a third filter.

13. The imaging apparatus as claimed in claim 1, further comprising:
    a first shielding element preventing from the first light emitting to the second and third image sensors, and preventing from the second light emitting to the third image sensor; and
    a second shielding element preventing from the second light emitting to the third image sensor, and preventing from the second reflected light emitting to the first and second image sensors,
    wherein the first shielding element is substantially parallel to the second shielding element, the first shielding element is substantially perpendicular to the first image sensor, and the second shielding element is substantially perpendicular to the second image sensor.

14. The imaging apparatus as claimed in claim 1, further comprising a light pipe transmitting the incident light.

15. The imaging apparatus as claimed in claim 1, wherein the first image sensor, the second image sensor, and the third image sensor are paralleled to each other.

16. The imaging apparatus as claimed in claim 1, wherein the first image sensor, the second image sensor, and the third image sensor are arranged along a flat plane.

\* \* \* \* \*